(12) United States Patent
Halter et al.

(10) Patent No.: US 6,792,606 B2
(45) Date of Patent: Sep. 14, 2004

(54) METHOD AND APPARATUS FOR OBJECT PERSISTENCE

(75) Inventors: Steven L. Halter, Rochester, MN (US); Paul B. Monday, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/118,666

(22) Filed: Jul. 17, 1998

(65) Prior Publication Data

US 2003/0163596 A1 Aug. 28, 2003

(51) Int. Cl.$^7$ .............................................. G06F 9/44
(52) U.S. Cl. ................................................... 719/315
(58) Field of Search ................ 709/315, 1; 707/103 R, 707/102; 719/315, 316; 717/100, 165

(56) References Cited

U.S. PATENT DOCUMENTS

| | | | |
|---|---|---|---|
| 5,247,669 A | 9/1993 | Abraham et al. | |
| 5,291,593 A | 3/1994 | Abraham et al. | |
| 5,295,256 A | 3/1994 | Bapat | |
| 5,297,279 A | 3/1994 | Bannon et al. | |
| 5,437,027 A | 7/1995 | Bannon et al. | |
| 5,590,327 A | 12/1996 | Biliris et al. | |
| 5,623,657 A | 4/1997 | Conner et al. | |
| 5,680,461 A | 10/1997 | McManis | |
| 5,692,047 A | 11/1997 | McManis | |
| 6,009,266 A | * 12/1999 | Brownell et al. | 395/683 |
| 6,298,428 B1 | * 10/2001 | Munroe et al. | 711/202 |
| 6,301,582 B1 | * 10/2001 | Johnson et al. | 707/103 R |
| 6,339,782 B1 | * 1/2002 | Gerard et al. | 709/1 |

FOREIGN PATENT DOCUMENTS

| | | | |
|---|---|---|---|
| EP | 0 735 465 A1 | 2/1996 | G06F/9/44 |
| EP | 0 735 473 A2 | 2/1996 | G06F/9/46 |
| EP | 0 690 375 A2 | 3/1996 | G06F/9/44 |
| EP | 0 766 185 A2 | 2/1997 | G06F/17/30 |

OTHER PUBLICATIONS

M. Atkinson et al, "An Orthogonally Persistent Java", ACM, Dec. 1996, pp. 68–75.*
"The Design of a new Persistent Object Store for PJama", Printezis, et al., Department of Computing Science, University of Glasgow, Jun. 1997, pp. 1–12.
"Object Data Management", R.G.G. Cattell, Persistence, Concurrency, and Discovery, pp. 135–156.
"Java (TM) Persistence via Persistent Virtual Storage", Johnson, et al., pp. 1–16.

* cited by examiner

*Primary Examiner*—Sue Lao
(74) *Attorney, Agent, or Firm*—Schmeiser, Olsen & Watts, LLP

(57) ABSTRACT

A preferred embodiment of the present invention provides an improved system and method for object persistence. The preferred embodiment facilitates the creation of persistent objects in a way that is orthogonal to class and does not require the use of persistent mixin classes. The preferred embodiment uses reference objects, which to the view of the system act as the object itself, and storage objects which persistently store the data for the persistent objets. The reference objects include pointers to the storage object, and provide address translation and indirection when accesses are to be made to the persistent object data stored in the storage object.

31 Claims, 4 Drawing Sheets

ABSTRACT# METHOD AND APPARATUS FOR OBJECT PERSISTENCE

BACKGROUND OF THE INVENTION

1. Technical Field

The present invention relates in general to object-oriented computer systems. More specifically, the present invention relates to the field of object persistence in object-oriented systems.

2. Background Art

The development of the EDVAC computer system of 1948 is often cited as the beginning of the computer era. Since that time, computer systems have evolved into extremely sophisticated devices, and computer systems may be found in many different settings. The widespread proliferation of computers prompted the development of computer networks that allow computers to communicate with each other. With the introduction of the personal computer (PC), computing became accessible to large numbers of people. Networks for personal computers were developed that allow individual users to communicate with each other.

Computer systems typically include operating system software that controls the basic function of the computer, and one or more software applications that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the software applications designed for high performance computer systems have become extremely powerful.

Object-oriented programming based on an object model is a new way of creating computer programs that has become very popular over the past several years. The goal of using object-oriented programming is to create small, reusable sections of program code known as objects that can be quickly and easily combined and re-used to create new programs. By creating and re-using a group of well-tested objects, a more stable, uniform, and consistent approach to developing new computer programs can be achieved.

One particular object-oriented programming language is Java which is specifically designed to create distributed object systems. Java offers many features and advantages that makes it a desirable programming language to use. First, Java is specifically designed to create small programs, commonly called applets, that can reside on the network in centralized servers, and delivered to the client machine only when needed. Second, Java is an interpreted language. A Java program can be written once and ran on any type of platform that contains a Java Virtual Machine (JVM). Thus, Java is completely platform independent. And third, Java is an object-oriented language, meaning that software written in Java can take advantage of the benefits of object-oriented programming.

One issue in object oriented programming, and Java programing in particular, is object persistence. Persistent objects, as opposed to transient objects, have a lifetime that transcends the lifetime of the program that created them. To make an object persistent, mechanisms must be put in place to allow a persistent object to survive beyond the lifetime of the process from which the object was created so that other processes can access the object. This typically involves the storing of the objects onto permanent storage devices, such as hard disks, optical disks, tape drives, etc.

One common approach to providing persistence is the use of a persistent mixin class of objects. In this approach all objects for which persistence is desired must have this persistent mixin class as a superclass somewhere in their class's inheritance lattice. Because a mixin class is required in the inheritance lattice, this method for providing object persistence cannot be used to provide persistence in a way that is orthogonal (i.e., independent) to the class of the object. Because the object persistence is not orthogonal to its class, the applications in which it can be used are limited.

Another approach which provides object persistence is "externalization". externalization is the means or protocol used in object-oriented programming for transferring data out of an object. In essence the "state data" that defines the attributes of an object are "externalized", or written out of the object into a local data store in a format compatible with the local data store. When the object is needed again, the externalized state data is internalized into an object, creating an exact copy of the object as it previously existed. Unfortunately, the process of externalizing the state data for storage and then internalizing it again when needed takes an excessive amount of processing time and thus slows performance in a way that can be unacceptable in many applications.

As the use of the object oriented programming increases, the need for a persistent object mechanism that overcomes the disadvantages of prior methods becomes more apparent. Without a mechanism that can be used to efficiently provide persistent objects in a Java and other interpreted programming environments, the computer industry will never fully realize the potential of the these programming environments.

SUMMARY OF THE INVENTION

A preferred embodiment of the present invention provides an improved system and method for object persistence. The preferred embodiment facilitates the creation of persistent objects in a way that is orthogonal to class and does not require the use of persistent mixin classes. The preferred embodiment uses reference objects, which to the view of the system act as the object itself, and storage objects which persistently store the data for the persistent objets. The reference objects include pointers to the storage object, and provide address translation and indirection when accesses are to be made to the persistent object data stored in the storage object.

The foregoing and other features and advantages of the present invention will be apparent from the following more particular description of the preferred embodiment of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements, and.

BEST MODE FOR CARRYING OUT THE INVENTION

Figure 1:
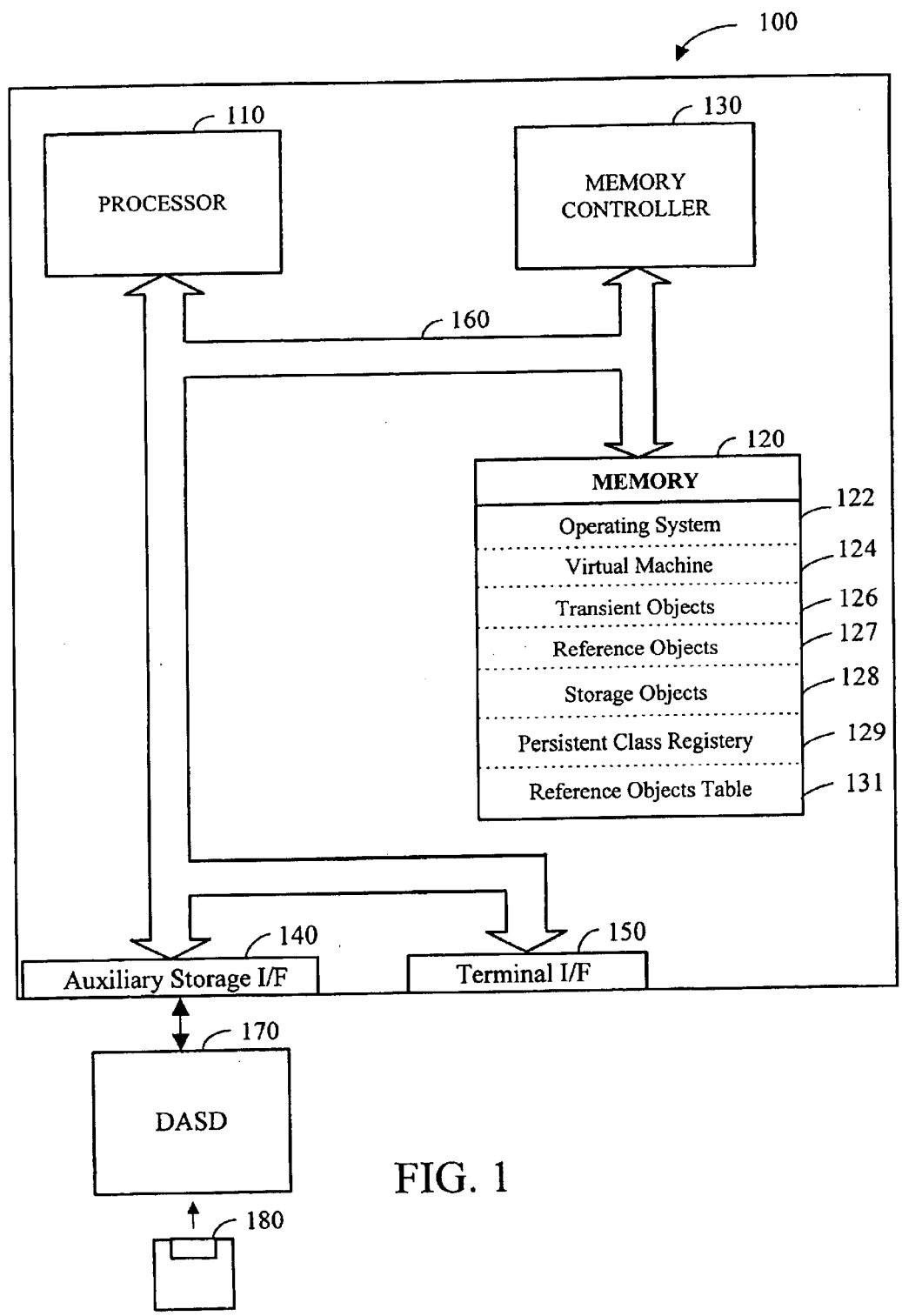
FIG. 1 is a block diagram of a computer system according to a preferred embodiment of the present invention.

The present invention relates in general to object-oriented programming techniques. For those individuals who are not generally familiar with object-oriented programming, the Java programming language, or single level storage (SLS) and two level storage (TLS) models, the Overview section below presents many of the basic concepts and terminology that will help to understand the invention. Individuals skilled in the art of object-oriented programming may wish to skip this section and proceed directly to the Detailed Description section of this specification.

1. Overview

Object-Oriented Technology v. Procedural Technology

Object-oriented programming is a method of program implementation in which programs are organized as cooperative collections of objects, each of which represents an instance of some class, and whose classes are all members of a hierarchy of classes united via inheritance relationships. Object-oriented programming differs from standard procedural programming in that it uses objects, not algorithms, as the fundamental building blocks for creating computer programs. This difference stems from the fact that the design focus of object-oriented programming technology is wholly different than that of procedural programming technology.

The focus of procedural-based design is on the overall process used to solve the problem; whereas the focus of object-oriented design is on casting the problem as a set of autonomous entities that can work together to provide a solution. The autonomous entities of object-oriented technology are, of course, objects. Object-oriented technology is significantly different from procedural technology because problems are broken down into sets of cooperating objects instead of into hierarchies of nested computer programs or procedures.

Thus, a pure object-oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what service to perform.

There are many computer languages available today that support object-oriented programming. For example, Smalltalk, Object Pascal, C++ and Java are all examples of languages that support object-oriented programming to one degree or another.

One issue in object oriented programming is object persistence. Persistent objects, as opposed to transient objects, have a lifetime that transcends the lifetime of the program that created them. To make an object persistent, mechanisms must be put in place to allow the object to survive the process that creates it so it can be accessed by other processes.

One common approach to providing persistence is the use of a use a persistent mixin class of objects. In this approach all objects for which persistence is desired must have this persistent mixin class as a superclass somewhere in their class's inheritance lattice. Because a mixin class is required in the inheritance lattice, this method of providing object persistence cannot be used to provide persistence in a way that is orthogonal (i.e., independent) to the class of the object. Because the object persistence is not orthogonal to class, the applications in which it can be used are limited.

Another approach which provides object persistence is "externalization". Externalization is the means or protocol used in object-oriented programming for transferring data out of an object. In essence the "state data" that defines the attributes of an object are "externalized", or written out of the object, into a different format that is easily stored in the local data store. When the object is needed again, the externalized state data is internalized into an object, creating an exact copy of the object as it previously existed. Additionally, any pointers in the persistent objects must be accounted for during externalization. This requires converting the pointer to an object "name" for storage, and then turning it back when the externalized object is recreated. All these process required for externalizing the state data for storage, dealing with internal pointers, and then internalizing it again when needed takes an excessive amount of processing time and thus slows performance in a way that can be unacceptable in many applications.

When persistence of an object is independent of its class or type, the persistence is said to be orthogonal to class. With an orthogonal persistence system, any object of any class can be made persistent. Thus, no special "persistence object base class" with special methods is required to be in the objects superclass lattice for the object to be persistent. Furthermore, all the procedures and methods defined by the superclass lattice are available on each object regardless of whether that object is persistent or transient.

Java Programming Language

Java is a modern object-oriented programming language designed by Sun Microsystems that has grown in popularity in recent years. Java offers many features and advantages that makes it a desirable programming language to use. First, Java is specifically designed to create small application programs, commonly called "applets," that can reside on the network in centralized servers, and which are delivered to the client machine only when needed. Second, Java is completely platform independent. A Java program can be written once and can then run on any type of platform that contains a Java Virtual Machine (JVM).

Java source code is compiled into bytecodes that can be interpreted to run on any type of platform. These bytecodes are platform neutral and must be used in conjunction with a Java runtime environment. The Java runtime environment provides the functionalities necessary to interpret bytecodes for use on a particular type of platform. The compiled Java source code must be used in conjunction with a Java runtime environment.

The JVM model is supported by most computer vendors, thereby allowing a software vendor to have access to hardware and software systems produced by many different companies. Finally, Java is an object-oriented language, meaning that software written in Java can take advantage of the benefits of object-oriented programming techniques. As in other object-oriented systems, operations in Java are performed by one object calling a method on another object. These objects can reside locally on the same machine or on separate JVM's physically located on separate computers or systems.

One particular problem associated with Java is object persistence. As mentioned, persistent objects are objects which exist beyond the lifetime of the process from which they were created. Java currently requires the use of mixin class or other methods that are not transparent to the user. Thus, the problems associated with creating, using and storing persistent objects in Java are significant.

Memory and File Systems

Modern computers use a variety of methods to manage, access and store data in computer systems. Computer systems typically contain two main types of data storage, transient data storage such as DRAM, and persistent storage such as hard disk drives, optical drives and such. Several systems exist for managing the flow of information between these storage mediums and the processors that execute the programs.

Most commodity computer systems today, such as IBM compatible personal computers running IBM's OS/2 or Microsoft's Windows, use a system called two-level store (TLS). TLS systems use a file system for storing data on permanent storage and a virtual memory system for running application processes. Included in the virtual memory system of TLS systems is a specialized data file called a swap file. The swap file is used as "extra memory" to store data for application processes that are too large to be loaded into the limited amount of "real memory".

In TLS systems a file manager keeps a directory that relates the name of a file to the location on the disk where the data for the file is stored. The file manager provides an interface to allow programs to "read" a file. The data from the file is then copied into memory, which include the real memory and the swap file. There, the data can be used and manipulated. When the program is finished with the data, a "write" operation is performed, which causes the data to be moved from the virtual memory back to the file on the disk.

In most TLS virtual memory systems, each application process is assigned its own virtual address space. For example, when the central computer creates a first process, the underlying operating system allocates a virtual address space for use by this process only. As the process executes the operating system will allocate real memory chunks for usage by the process. As each real chunk is allocated, the operating system will also create a mapping of the process virtual addresses to real memory. This procedure would be repeated for other application processes running on the same computer. As the real memory becomes over committed, the contents of the real memory can be temporarily moved to the swap file and the real memory portion reused by other processes.

When an application processes is started, the data for the application must first be moved from its permanent storage file to the virtual memory system. This typically involves copying a portion of the application into real memory and a portion of the application into the swap file. The application then runs from the real memory, using its virtual addressing while the operating system moves portions of the application between real memory and the swap file as needed.

This system does have its advantages. For example, because the operating system hides the complexity of real memory system and swap file from the application, it is easier to write applications. Second, it isolates each process from all others so that bugs in one process do not usually cause bugs in other processes.

The system unfortunately also has several disadvantages. One of these is the context dependent nature of the virtual addresses. Because each application uses a virtual address range that has no meaning to other applications, addresses cannot be easily shared between applications. For example, only the first application process could access its allocated chunk of memory, but cannot access data in a second chunk of memory which belongs to the second process.

This context dependency is especially troubling for persistent objects, which by definition can outlive the application processes which created them. Persistent objects typically contain address pointers which reference valid information when created. However, as mentioned, the TLS model creates memory for each process and destroys the memory when the process is eliminated. Therefore, when a persistent object is created, the pointers contained within the object remain valid only as long as the application which created the persistent object is in memory. Once the persistent object is saved onto backing store, the meaning of the pointers within the object are lost.

In order to avoid this problem, externalization techniques are required to convert the pointer to an object "name" when storing the persistent object. When the persistent object is retrieved from backing store and a new runtime representation of the object is created, the object name must be converted to a new valid pointer. This process of creating a new runtime copy of the persistent objects and converting pointer references contained within persistent objects results in significant overhead on the CPU.

The single level storage (SLS) model was developed in response to the memory management problems described above. The SLS system maps all of the data storage mediums, generically referred to as backing store, into a single large address space. The backing store can include any type of local storage medium, such as magnetic and optical disk drives, and can also include the storage mediums of multiple computer systems connected by large networks. In the SLS model each byte of data contained within this large backing store area is addressed using its own unique, context independent virtual address. This makes the entire storage system function as a single "virtual memory" with a context independent addressing scheme.

The SLS model is very efficient means of making and manipulating persistent objects because it reduces the amount of system overhead to store and retrieve persistent objects from backing store. In an SLS system, persistent objects, including pointers to other objects contained within the persistent object, can be stored in backing store without modification.

This is allowed because pointers stored in persistent objects in an SLS system are context independent. Because all applications share the same large virtual address space, all pointers to objects remain valid regardless of their context. This eliminates the need for converting pointer references to "names" when storing persistent objects.

Thus, no separate steps are required to store persistent objects to backing store, such as those required to externalize object data in TLS systems. Likewise, no separate steps are needed to retrieve persistent objects from backing store. When a persistent object is needed from backing store, the persistent object can be simply copied from backing store into a memory buffer, with no recreation required. Thus, SLS systems eliminate the need to create different runtime and storage versions of persistent objects. Because persistent objects can be simply copied from backing store to/from memory as needed, processor overhead in dealing with persistent objects is significantly reduced.

Furthermore, because all address pointers are context independent, they can be easily shared between processes. In contrast, the context dependent pointers of TLS are valid only in the processes that created them and cannot be shared without some difficultly.

The SLS model has been successfully implemented using 48 and 64 bit memory addresses since 1980 (IBM System/38 and AS/400).

2. Detailed Description

Referring now to FIG. 1, a computer system 100 in accordance with a preferred embodiment of the present invention is a IBM AS/400 computer system. However, those skilled in the art will appreciate that the method and apparatus of the present invention apply equally to any computer system, regardless of whether the computer system is a complicated multi-user computing apparatus or a single user device such as a personal computer or workstation. Thus, computer system 100 can comprise other types of computers such as IBM compatible personal computers running OS/2 or Microsoft's Windows. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes an object-oriented computer programs within main memory 120.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. In this application, the term "backing storage" will be used to collectively refer to all types of storage devices, including disk drives, optical drives, tape drives, etc. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 180) and CD ROMS, and transmission type media such as digital and analog communication links, including wireless communication links.

Memory controller 130, through use of a processor is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports-directional communication in a computer-related environment could be used.

In the preferred embodiment, memory 120 suitably includes an operating system 122, a virtual machine 124, transient objects 126, reference objects 127, storage objects 128, a persistent class registry 129 and a reference object table 131. It should be understood that for purposes of this application, in memory 120 is used in its broadest sense, and can include Dynamic Random Access Memory (DRAM), Static RAM (SRAM), flash memory, cache memory, etc. Additionally, memory 120 can comprise a portion of a disk drive use used as a swap file. While not explicitly shown in FIG. 1, memory 120 may be a single type of memory component or may be composed of many different types of memory components. For example, memory 120 and CPU 110 may be distributed across several different computers that collectively comprise system 100. It should also be understood that programs in memory 120 can include any and all forms of computer programs, including source code, intermediate code, machine code, and any other representation of a computer program.

It should be noted that the virtual machine 124 is preferably a Java virtual machine, but it could also be a virtual machine for any other interpreted object-oriented language.

The reference objects 127, storage objects 128 persistent class registry 129 and reference object table 131 provide a mechanism for object persistence. In particular, the reference objects 127 act as "regular objects" to the view of the programmer while providing the ability to store instance data persistently in storage objects 128. The reference object table 131 tracks the reference objects that have been created by pointer to the corresponding storage object 128. The persistent class registry 129 is used to track those Java classes for which persistent objects can be created. In particular, in most implementations it is desirable to limit what types of persistent objects can be created. The preferred embodiment provides persistent class register 129 which is used to list those classes for which persistent Java objects can be created. These classes could be added to the persistent class register 129 automatically whenever a new persistent object of a new class is to be created, or manually added through the use of a specified command. Additionally, when a class is added, any needed parent class would also preferably be added.

Figure 2:
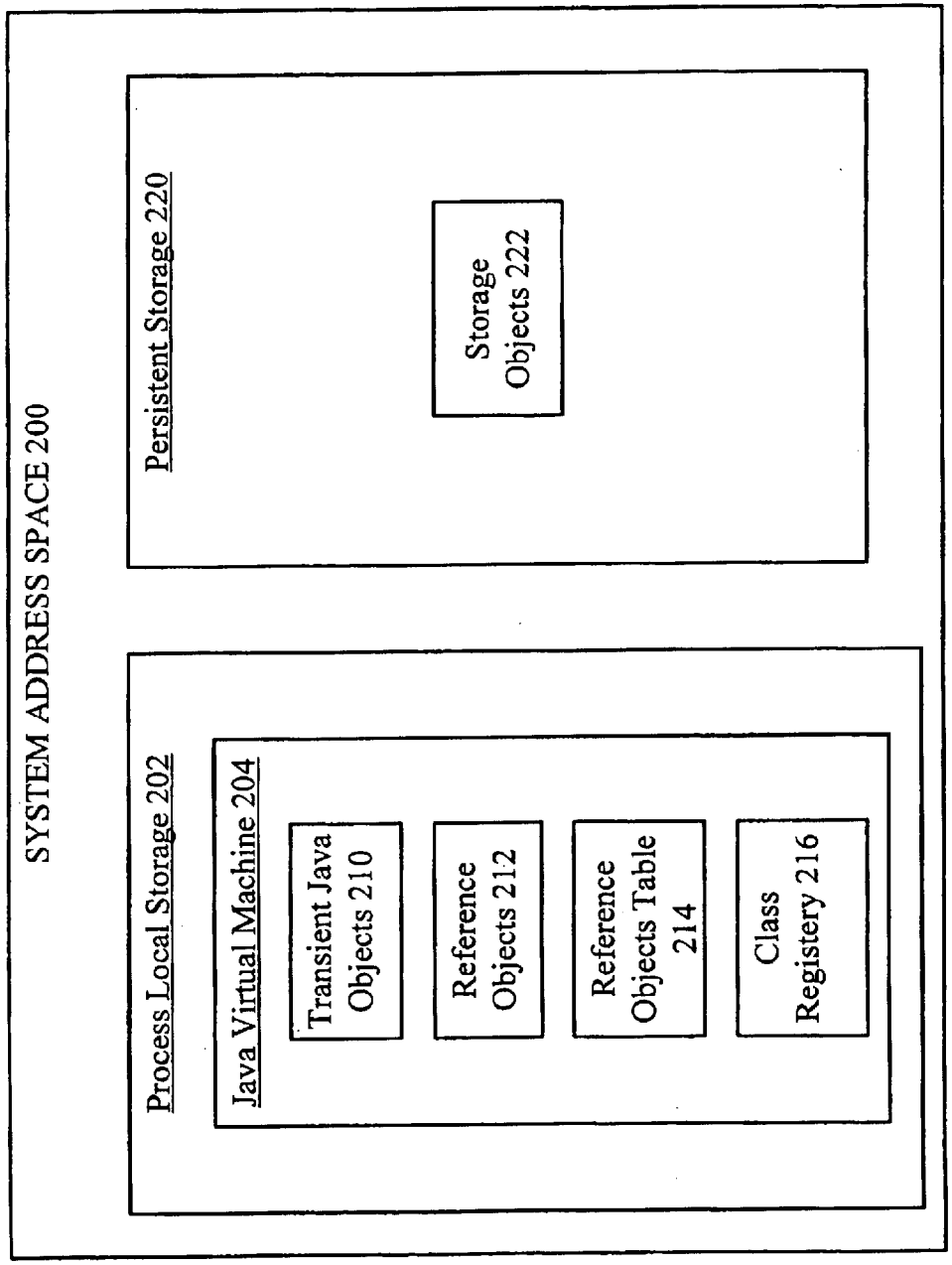
FIG. 2 is a block diagram illustrating a memory space and the elements within in accordance with the preferred embodiment.

Referring now to FIG. 2, in the preferred embodiment all data in memory 120 and backing storage is accessed using a system address space that comprises a large, single level store address space. In particular, the preferred embodiment system address space comprises the large 64 bit address space as found in AS/400 systems. This address space provides the ability to use single level storage semantics in the storage of persistent objects. Using single level storage semantics facilitates the use of context independent pointers. In most systems, a portion of the system address space is reserved for process local storage 202. Process local storage 202 is the portion of the address space used to store currently running programs. In the preferred embodiment, Java Virtual Machine (JVM) 204 is included in process local storage 202. Also included in process local storage is a memory buffer, where data is copied from backing storage by the memory system as needed.

JVM 204 provides a self-contained operating environment in which Java programs can be executed. JVM 204 preferably includes a interpreter that interprets Java bytecodes for use on a particular platform, as well as a mechanisms for garbage collection and other functionality. Because Java is an object oriented programming language, programs and data that run in JVM 204 comprise a plurality of Java objects. Additionally, because Java does not provide any built in method for making Java objects persistent, these Java objects are usually all transient objects, such as transient objects 210.

In accordance with the preferred embodiment, a plurality of reference objects 212 are included in JVM 204 in process local storage 202. These reference objects 212 provide address translation and pointers to corresponding storage objects 222 included in the persistent storage area 220 of system address space 200. The storage objects 222 are used to persistently store the instance data for persistent Java objects.

Also in accordance with the preferred embodiment, a reference object table 214 is included to facilitate locating reference objects corresponding to particular persistent storage objects. Included in this table is a list of all the reference objects created and their associated to storage objects. The table can be searched by pointer. Thus, when the JVM 202 encounters a persistent pointer, the reference object table 214 can be searched to determine if a reference object corresponding to the storage object identified by the persistent pointer has already been created. If not, a reference object for that pointer can be created and added to the reference object table 214.

In the preferred embodiment, the indirection provided by the reference objects 212 is transparent to the Java programmer. To the Java programmer the reference objects 212 behave as the normal transient Java objects 210, except that the reference objects 212 can be used to store persistent data. Thus, to the view of the Java programmer reference objects 212 are just like other instances of the various classes of Java objects.

In the preferred embodiment, whenever a persistent object is to be created, a reference object 212 is created in process local storage 202, with the reference object 212 functioning as the "Java object" to the view of the Java programmer. At the same time, a storage object 222 is created in the persistent storage area 220. The storage object 222 is used to persistently store the instance data for the created Java object.

When you first start an object oriented program that is going to access previously created persistent objects, those persistent storage objects must be located by the program and reference objects created for those storage objects. Locating the persistent storage objects can be done in several ways. For example, a naming lookup service can be provided to track persistent objects. The naming lookup service allows persistent objects to be located using a "find object by name method" that uses a naming store and looks up the persistent storage object by name, and creates a reference object corresponding to that persistent storage object.

If the found persistent storage object contains pointers to other persistent storage objects these other objects can be located using those pointers and reference objects created for those objects.

It should be noted that Java, like several other object-oriented languages uses garbage collection to destroy objects when no other objects point to that object. In this way, system resources are conserved. In the preferred embodiment, when a reference object 212 is no longer pointed to, the reference object, like any other object can be garbage collected. To again access the persistent storage object, the naming service described above would once again be used to locate the persistent storage object or a persistent pointer followed to the persistent storage object, and a new reference object 212 created.

In the preferred embodiment, pointers are retrieved from objects using the getfield( ) bytecode. In the preferred embodiment the implementation of the getfield( ) bytecode is designed to recognize when a field is tagged as pointer, allowing the JVM to recognize that it is loading a persistent pointer. The getfield( ) bytecode would then load the persistent pointer, and check the reference object table 214 to see if a reference object table to see if a reference object has already been created for the persistent object referenced by the persistent pointer. If a reference object has already been created, the address of the reference object is returned to the JVM. If a reference object has not been created, the getfield( ) bytecodes creates a reference object, and then returns the address of the new reference object to the JVM. Thus, whenever a call is to be made on the persistent object, that call will instead be made to the reference object, which will then perform the operation on the persistent storage object. In this way, the preferred embodiment provides the ability for the JVM to work with persistent objects in a way that is transparent to the rest of that system.

When a method call or other access is made to a Java object, the JVM 202 performs the operation on the corresponding by calling the appropriate bytecode to operate on the Java object. In the case of a normal transient object, the bytecode performs the operation directly. In the preferred embodiment, when the method call is made to a persistent object, the corresponding bytecode is again called to operate on the corresponding reference object 212. In the preferred embodiment however, the reference object will include a persistent flag that allows the bytecode to recognize that the called object not a regular transient Java object and is instead a reference object used to facilitate the persistent storage of instance data. The operating bytecode upon recognizing that the called object is a reference object 226, can then retrieve a pointer to the corresponding storage object 222 from the reference object 226. The bytecode can then use this pointer to perform its operation on the storage object 222. This typically entails reading data from or loading data into the storage object 222.

In the preferred embodiment, storage object 222 is stored in a persistent storage 220 portion of the system address space 200. This portion of the system address space 200 is mapped to a backing storage medium such as a hard disk drive to allow data in this portion to be stored persistently. When data is needed from the backing storage, it is copied into a portion of memory reserved for this purpose called a memory buffer. In the preferred embodiment, when the bytecode performs its operation on the storage object 222, the memory system must retrieve the storage object 222 from backing storage using the pointer from the reference object and load the storage object 222 into the memory buffer unless the storage object 222 has already been loaded into memory.

In the preferred embodiment where the system address space comprises a large single-level storage (SLS) address space, the operation of obtaining the storage object 222 pointer from the reference object 212 and retrieving the storage object 222 from backing storage is greatly simplified due to the context independent nature of SLS pointers. In particular, no mechanism is needed to translate the pointers into a context independent, persistent form.

Figure 3:
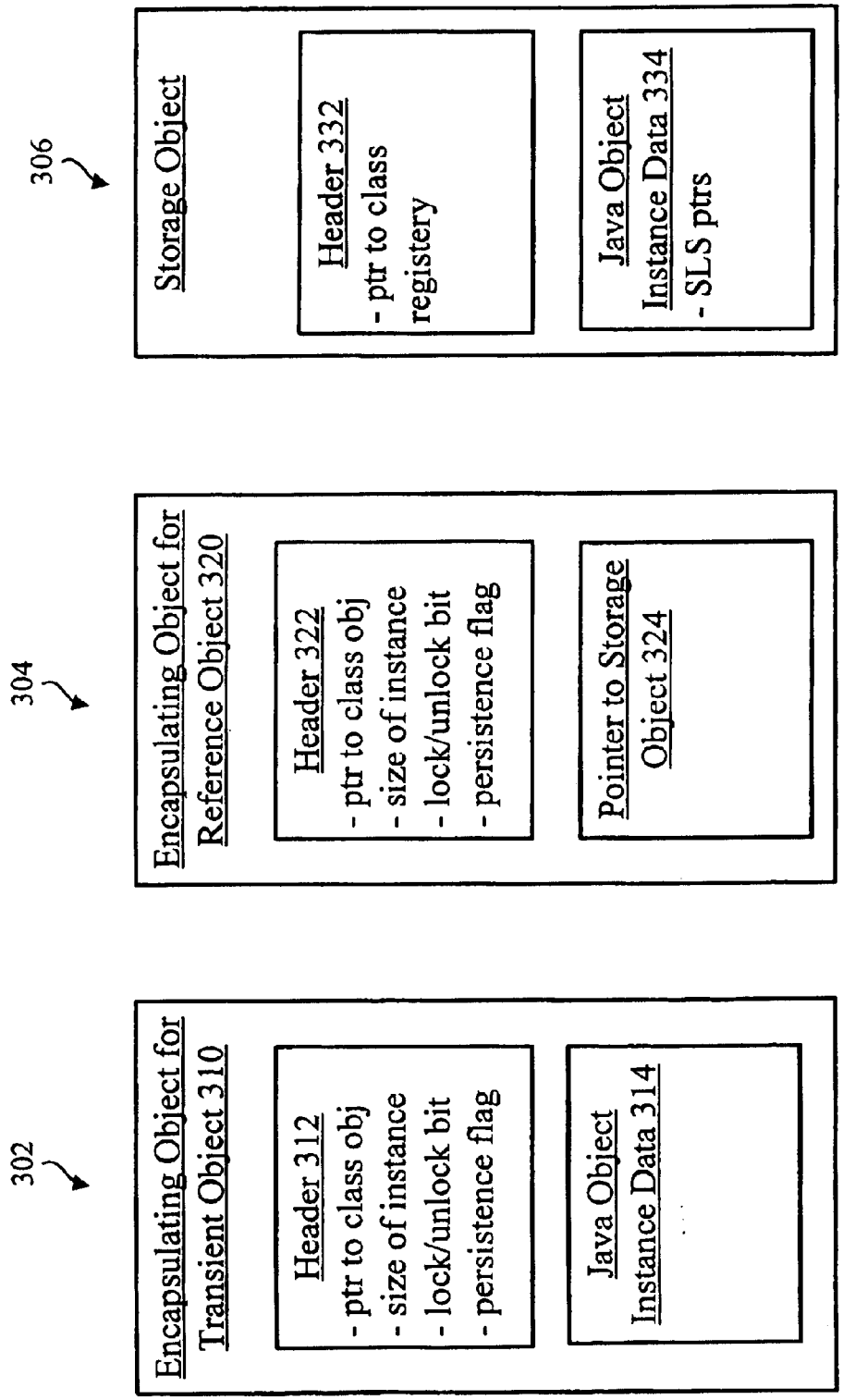
FIG. 3 is a schematic representation of a transient Java object, a reference object, and a storage object in accordance with the preferred embodiment of the present invention.

Turning now to FIG. 3, a transient java object 302, a reference object 304 and a storage object 306 are illustrated in more detail as they would be implemented in a JVM. In the preferred embodiment, transient Java object 302 and reference object 304 are both Java objects that reside in a JVM. In most object-oriented JVM implementations, Java objects are actually implemented by storing the Java object instance data inside "encapsulating objects" that are defined as part of the JVM implementation. Thus, in FIG. 3, transient Java object 302 comprises an encapsulating object 310 which includes a header 312 and the Java object instance data 314. Likewise, the reference object 304 comprises encapsulating object 320 which includes a header 322 and a pointer 324 to the corresponding storage object 306.

It should be noted that in non-object oriented JVM implementations, the Java object instance data would typically be encapsulated in another data structure format, such as an array, instead of being encapsulated in an formal object.

Encapsulating objects provide the methods and data needed to work with the underlying hardware and operating system. These encapsulating objects are defined as part of the JVM implementation, and are thus preferably created using a programing language that can work directly with the underlying system, such as C, C++, Smalltalk, Basic, etc. The encapsulating objects preferably include methods used by the JVM when accessing the Java object instance data. This is part of the preferred object-oriented implementation of the JVM. Thus, bytecodes such as getfield( ) and putfield( ) are implemented as methods on the encapsulating objects. Other, less involved methods may be implemented as simple procedure calls. The encapsulating objects also preferably include data, typically in the form of a an object header, that is used by the JVM to provide accesses to the Java object instance data within.

In the preferred embodiment, the encapsulating object is the same for both normal transient Java objects and reference objects to avoid having to define and implement multiple types of encapsulating objects in the JVM implementation, although multiple types could be used if desired. However, in some embodiments a few data fields in the encapsulating object are used for different purposes in reference objects then those fields are used for in normal transient Java objects.

In FIG. 3 several common types of data stored in the encapsulating object header are illustrated. This data includes a pointer to the Java class object which contains the class data for the encapsulated Java object; the size of encapsulated Java object, and a lock/unlock bit used for a synchronization.

In the preferred embodiment, a persistence flag is added to the encapsulating object's data for transient Java objects and reference objects. The persistence flag is used to denote whether the encapsulated Java object is transient, and therefore stored within the encapsulating object, or whether the encapsulated Java object is persistent, and therefore stored in a corresponding storage object. By providing a persistence flag to the encapsulating object, the JVM is able to quickly determine if the encapsulated Java object is persistent. It does this when field accesses (in the form of bytecodes) are to be performed on the Java object.

It should again be noted that to the view of the Java program and the Java programmer, the reference object is the Java object just like any other Java object, the only difference being that it allows the storage and retrieval of persistent data. The processes of retrieving instance data from persistent storage and performing an operation on that instance data is transparent to the Java programmer. Thus, to the view of the Java program it performs just like an access to a normal transient Java object. Only the JVM recognizes the persistent nature of the data stored with reference and storage objects and performs the operations needed to access that persistent data when needed.

In the preferred embodiment, the reference object 304 includes a pointer to the storage object 306 which persistently stores the instance data for the persistent Java object. This can be implemented in several ways. For example, the pointer could be included in a place where the instance data would normally be stored, as illustrated in FIG. 3. In another example, a data field in the header could be used to store the storage object pointer. This data field could be one added for this purpose, or a data field that contains needed data for transient objects but is otherwise not needed for the reference object.

Where the system is implemented on a computer that uses SLS storage, such as IBM's AS/400, the storage object pointer can comprise a regular pointer address, as pointers in these systems are context independent and thus remain valid even after the process that created them ends. If implemented on another system, another addressing scheme will need to be provided to allow persistent addressing of the storage object.

In the preferred embodiment, storage object 306 comprises the Java object instance data 334. In the preferred embodiment, the storage object 306 is implemented as an AS/400 system object. Implementing the object in this way allows the storage object 306 to have all the functionality of AS/400 system objects. For example, the storage object 306 would thus have the ability to resolve pointers to named objects automatically.

The storage object 306 preferably includes a header 332 that includes a pointer to the class registry described above. The storage object 306 also preferably includes the Java object instance data 334. The Java object instance data 334 includes all the data needed to persistently store the corresponding Java object. Additionally, in the preferred embodiment everything that is not a pointer in the storage object is stored in the same format as it would be stored in a normal object in the JVM. Pointers to persistent objects, stored in a storage object, are preferably stored as persistent pointers to the location of the pointed to object in backing storage, while pointers to persistent objects stored in normal transient objects point to the reference object corresponding to the storage object.

Thus, the preferred embodiment of the present invention provides object persistence by providing a reference object that acts as the Java object in the JVM while persistently storing the instance data of the Java object in a storage object elsewhere.

It should be noted that in addition to storing the instance data persistently, other storage and reference objects can be created to store any needed class data persistently.

Otherwise, care needs to be taken to store all data which is needed to make an object persistent in the instance data of the object itself.

When a call is made to a persistent object, the JVM recognizes that this object is persistent and works with the underlying memory system to complete the access. When the object is a persistent object residing with its instance data stored in backing storage, the SLS is used to bring in the storage object and its data from backing storage into the memory buffer. With the storage object in the memory, the JVM can perform the desired operation on the instance data. Again, this process of recognizing that the Java object is persistent, bringing the storage object into memory, and performing the desired operation on the storage object is all transparent to the Java program.

In operation, Java is complied to an intermediate set of instructions which are called bytecodes. Several of these bytecodes are used to access the data in Java objects. These include getfield( ) and putfield( ) which are used to get a field for a Java object and store a field in a Java object respectively. Likewise, aaload( ), iaload( ), laload( ), faload( ), daload( ), baload( ), caload( ), saload( ), aastore( ), iastore( ), lastore( ), fastore( ), dastore( ), bastore( ), castore( ), and sastore( ) bytecodes are used to load and store fields from array objects of various types.

The bytecodes are then interpreted by an interpreter in the JVM. In some JVM implementations the bytecodes can be further compiled at this point to actual machine code of the hardware the JVM is running on.

In prior art systems where only transient Java objects are created, the JVM bytecodes could always find the Java object instance data in the local memory of the process in which the Java program is running in. In the preferred embodiment however, the bytecodes need to be able to recognize when an object is a persistent object with its instance data stored persistently in a storage object, and be able to locate and interact with this instance data in the storage object. As discussed above, in the preferred embodiment a persistence flag is added to all objects to indicate whether they are a regular transient object or a reference object to a persistently stored storage object. Furthermore, as discussed above the reference objects include a pointer to the storage object that stores the Java object instance data persistently. In the preferred embodiment, the implementation of the JVM is changed to be able to interact with the instance data in the storage object.

Thus, for the preferred embodiment of the present invention to be implemented in the preferred manner, several changes need to be made to the functionality of the Java Virtual Machine. In particular, it is desirable to change the implementation of the getfield( ) and putfield( ) bytecodes. In the preferred embodiment, the getfield( ) and putfield( ) bytecodes are modified to recognize when the object in question is a persistent object by checking the persistence flag. When the object is persistent the bytecode retrieves the storage object pointer from the reference object. With the pointer to the storage object, the getfield( ) and putfield( ) bytecodes can then perform their respective field access operations on the instance data stored in the storage object.

As described above, the getfield( ) bytecode is also preferably modified to automatically recognize when an accessed field contains a persistent pointer to another object, and to check the reference object table for a reference object corresponding to the pointer, creating a reference object if needed, and passing the address of the reference object to the JVM instead of the original persistent pointer requested.

Another desirable change needed to fully implement the preferred embodiment is to modify the aaload( ), iaload( ), laload( ), faload( ), daload( ), baload( ), caload( ), saload( ), aastore( ), iastore( ), lastore( ), fastore( ), dastore( ), bastore( ), castore( ), and sastore( ) bytecodes that are used to load and store fields from array objects of various types. In the preferred embodiment these bytecodes are also are modified to recognize when the data in question is persistent by checking the persistence flag. When the data is persistent these bytecode retrieve the storage object pointer from the reference object, and then perform their respective field access operations on the data stored in the storage object.

Another desirable change to fully implement the preferred embodiment is to modify the monitorenter( ) and monitorexit( ) bytecodes. The monitorenter( ) and monitorexit( ) bytecodes are used by the JVM to lock and unlock objects as they are accessed by other objects. When an object is locked, it cannot be accessed by any other object until it is unlocked. In the preferred embodiment, the monitorenter( ) and monitorexit( ) bytecodes are modified to set a lock bit on the storage object when it determines that a object is a reference object.

Another desirable change is to provide a method for creating new persistent objects. This method would preferably be implemented as a native method. In Java, a native method is a method whose actual implementation language is not Java, but rather a different language such as C++. In this case the method would preferably be implemented using the same language that implemented the JVM. This would all the native method to work with the JVM implementation. The native method, when called to create a new persistent object would create a storage object 306 for the persistent data and a reference object 304. The native method would then return the address of the reference object 304 to the caller of the native method.

Figure 4:
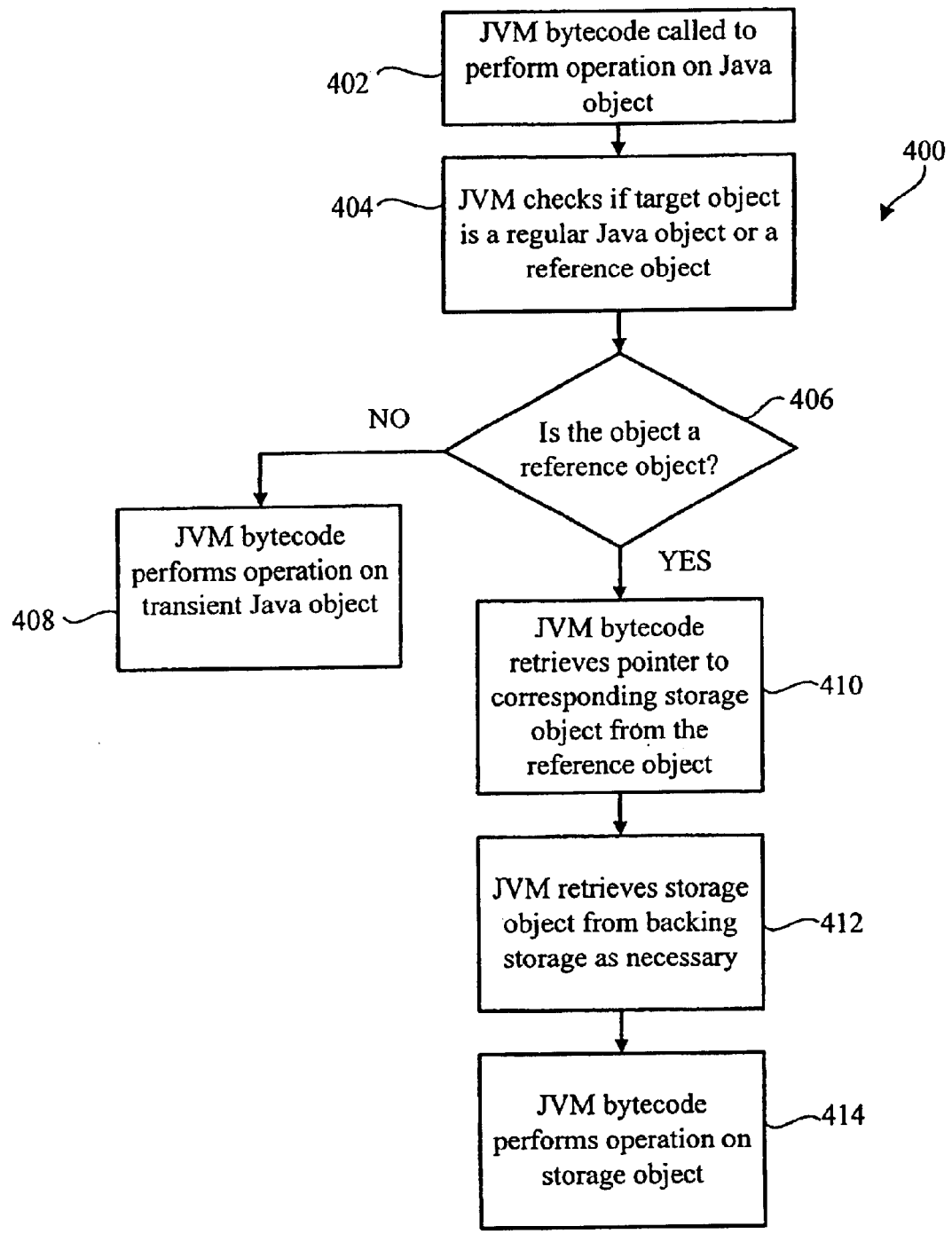
FIG. 4 is a flow diagram of a method for performing accesses on objects in accordance with the preferred embodiment of the present invention.

Referring now to FIG. 4 a method 400 for performing accesses on persistent objects in accordance with the preferred embodiment is illustrated. The first step 402 occurs when a JVM bytecode is called to perform an operation on a Java object. The JVM bytecodes can be any of the bytecodes which are used to provide field accesses and other operations in the course of running Java programs. The next step 404 is for the JVM to determine if the target Java object is a regular, transient Java object, or a reference object used to implement a persistent Java object. As discussed above, this is preferably done by checking a persistence flag contained in the implementation of Java objects used to indicate the nature of a particular object. If the target Java object is not a reference object, the next step 408 is for the JVM bytecode to perform is operation on the transient Java object in the standard way. If the target object is a reference object, the next step 410 is for the JVM to retrieve a pointer to the corresponding storage object from the reference object. With the pointer to the storage object retrieved, the next step 412 is to retrieve the storage object from backing storage, if necessary. Typically, this operation will be handled by the memory system of the underlying operating system, which will first check to see if the storage object is already in the memory buffer before copying the storage object into the memory buffer. With the storage object in memory, the next step 414 is to perform the JVM bytecode operation on the storage object as it would on a normal transient Java object.

It should be noted that the details of the persistent object implementation is hidden from the view of the Java program, with the JVM dealing with these details The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

What is claimed is:

1. An apparatus comprising:
at least one processor;
a memory coupled to the at least one processor;
an object persistence mechanism residing in memory, the object persistence mechanism including a reference object and a persistent storage object, with the reference object having a persistence flag to indicate that the reference object is a reference object and a pointer to the persistent storage object, wherein said reference object resides in a virtual machine, wherein the virtual machine includes a getfield bytecode, wherein said getfield bytecode retrieves a specified field from a specified object, wherein said getfield bytecode checks the specified object for a persistence flag before retrieving the specified field, and wherein the getfield bytecode retrieves the specified field from an associated storage object when said persistence flag indicates that the specified object is a persistent object; and
a large single-level storage (SLS) address space such that no mechanism is needed to translate the pointer into a context independent persistent form.

2. The apparatus of claim 1 wherein the persistent storage object includes instance data for an object dial is to be persistent.

3. The apparatus of claim 1 wherein the pointer to the persistent storage object comprises a 64 bit address.

4. The apparatus of claim 1 wherein the persistent storage object comprises an AS/400 system object.

5. The apparatus of claim 1 wherein the reference object appears as a normal object to other objects in memory.

6. The apparatus of claim 1 further comprising a plurality of transient objects residing in memory, wherein each of the plurality of transient objects includes a persistence flag indicating that the plurality of transient objects are not persistent.

7. The apparatus of claim 1 wherein the virtual machine comprises a Java virtual machine.

8. The apparatus of claim 1 wherein the getfield bytecodes checks to determine if the specified field includes a persistent pointer to a storage object, and wherein the getfield bytecode retrieves a pointer to a corresponding reference object when said specified field includes a persistent pointer to a storage object.

9. The apparatus of claim 1 wherein the virtual machine includes a putfield bytecode, wherein said putfield bytecode stores data into a specified field in a specified object, wherein said putfield bytecode checks the specified object for a persistence flag before putting the data into the specified field and wherein the putfield bytecode puts the data into the specified field of an associated storage object when said persistence flag indicates that the specified object is a persistent object.

10. The apparatus of claim 1 wherein the persistence mechanism further includes a persistent class registry, said persistent class registry tracking classes for which persistent objects can be made.

11. The apparatus of claim 1 wherein the persistence mechanism further includes a reference object table, said reference object table including a list of all reference objects created in said memory searchable by persistent address of associated storage object.

12. A method for providing object persistence comprising the steps of:
a) providing a storage object persistently stored in a backing storage, the storage object storing instance data for a first object;
b) providing a reference object corresponding to the storage object, the reference object including a persistence flag indicating the reference object is a reference object and a pointer to the corresponding storage object in backing storage; and
c) performing a field access on the first object by calling a method on the reference object, retrieving the pointer to the corresponding storage object in backing storage and performing the field access on the corresponding storage object, wherein the reference object resides in a virtual machine, wherein the step of performing a field access comprises performing a getfield access, and wherein the step of performing the field access on the storage object comprises checking to determine if the accessed field includes a persistent pointer to a second storage object, and further comprising the steps of checking if a second reference object corresponding to the second storage object exists and creating a second reference object if it does not exist and passing an address to the second reference object.

13. The method of claim 12 wherein the step of performing the field access comprises checking the persistence flag on the reference object to determine that the reference object is a reference and not a regular transient object.

14. The method of claim 12 wherein the step of performing a field access comprises performing a getfield access.

15. The method of claim 12 wherein the step of performing a field access comprises performing a putfield access.

16. The method of claim 12 wherein address stored in the storage object comprise persistent single level storage addresses.

17. The method of claim 12 wherein the virtual machine is a Java virtual machine.

18. The method of claim 12 wherein the storage object comprises an AS/400 system object.

19. A program product comprising:
(A) an object persistence mechanism, the object persistence mechanism including a references object and a persistent storage object, with the reference object having a persistence flag to indicate that the reference object is a reference object and a pointer to the persistent storage object, wherein the virtual machine includes a getfield bytecode, wherein said getfield bytecode retrieves a specified field from a specified object, wherein said getfield bytecode checks the specified object for a persistence flag before retrieving the specified field, wherein the getfield bytecode retrieves the specified field from an associated storage object when said persistence flag indicates that the specified object is a persistent object, wherein the getfield bytecodes checks to determine if the specified field includes a persistent pointer to a storage object, and wherein the getfield bytecode retrieves a pointer to a corresponding reference object when said specified field includes a persistent pointer to a storage object; and
(B) signal bearing media bearing the object persistence mechanism, wherein said reference object resides in a virtual machine.

20. The program product of claim 19 wherein the signal bearing media comprises recordable media.

21. The program product of claim 19 wherein the signal bearing media comprises transmission media.

22. The program product of claim 19 wherein the persistent storage object includes instance data for an object that is to be persistent.

23. The program product of claim 19 wherein the pointer to the persistent storage object comprises a 64 bit address.

24. The program product of claim 19 wherein the persistent storage object comprises an AS/400 system object.

25. The program product of claim 19 wherein the reference object appears as a normal object to other objects.

26. The program product of claim 19 further comprising a plurality of transient objects, wherein each of the plurality of transient objects includes a persistence flag indicating that the transient object is not persistent.

27. The program product of claim 19 wherein the virtual machine comprises a Java virtual machine.

28. The program product of claim 19 wherein the virtual machine includes a putfield bytecode, wherein said putfield bytecode stores data into a specified field in a specified object, wherein said putfield bytecode checks the specified object for a persistent flag before putting the data into the specified field and wherein the putfield bytecode puts the data into the specified field of an associated storage object when said persistence flag indicates that the specified object is a persistent object.

29. The program product of claim 19 wherein the persistence mechanism further includes a persistent class registry, said persistent class registry tracking classes for which persistent objects can be made.

30. The program product of claim 19 wherein the persistence mechanism further includes a reference object table, said reference object table including a list of all reference objects created in said memory searchable by persistent address of associated storage object.

31. A method for providing object persistence comprising the steps of:
   a) providing a plurality of transient objects in a virtual machine, the plurality of transient objects each including a persistence flag indicating the plurality of transient objects are not reference objects;
   b) providing a storage object persistently stored in a backing storage, the storage object storing instance data for an persistent object;
   c) providing a reference object corresponding to the storage object, the reference object residing in the virtual machine and including a persistence flag indicating the reference object is a reference object, the reference object including a pointer to the corresponding storage object in backing storage;
   d) providing a large single-level storage (SIS) address space such that no mechanism is needed to translate the pointer into a context independent persistent form; and
   e) performing a field access on an first object, wherein the stops of performing a field access on the first object comprises the steps of:
      I) checking the persistence flag of the first object to determine if the first object is a reference object;
      ii) performing the field access on the first object if the first object is not a reference object;
      iii) retrieving the pointer to the corresponding storage object in backing storage and performing the field access on the storage object in backing storage if the first object is a reference object.

* * * * *